United States Patent [19]
Howard

[11] 3,972,041
[45] July 27, 1976

[54] ADAPTIVE CLUTTER VELOCITY CANCELLATION SYSTEM FOR PULSED DIGITAL MTI SYSTEM

[75] Inventor: Shirly L. Howard, Canoga Park, Calif.

[73] Assignee: International Telephone and Telegraph Corporation, New York, N.Y.

[22] Filed: Feb. 25, 1975

[21] Appl. No.: 552,926

Related U.S. Application Data

[63] Continuation-in-part of Ser. No. 125,257, March 17, 1971, abandoned.

[52] U.S. Cl. .............................. 343/7.7; 343/5 DP; 343/7 A
[51] Int. Cl.² ........................................... G01S 9/42
[58] Field of Search .................. 343/5 DP, 7.7, 7 A

[56] References Cited
UNITED STATES PATENTS

| | | | |
|---|---|---|---|
| 3,631,488 | 12/1971 | Evans | 343/5 DP X |
| 3,633,173 | 1/1972 | Edge | 343/5 DP X |
| 3,680,096 | 7/1972 | Bosc | 343/7.7 |
| 3,701,149 | 10/1972 | Patton et al. | 343/5 DP |
| 3,720,942 | 3/1973 | Wilmot et al. | 343/7.7 |
| 3,761,922 | 9/1973 | Evans | 343/5 DP |

*Primary Examiner*—T.H. Tubbesing
*Attorney, Agent, or Firm*—William T. O'Neil

[57] ABSTRACT

A digital MTI radar system for improved handling of "moving clutter" which employs a double phase detector scheme to provide both Doppler sine and Doppler cosine terms which are separately digitally encoded in a series of range increments throughout each pulse repetition interval. The discrete digitally encoded values thus represent instantaneous echo signal phase angle in each corresponding range increment. This angle data is compared by range increments with that of the last previous pulse repetition period, to provide net signal phase angle change in digital form (a velocity related term) by range increments successively. The remaining circuitry comprises a device for sampling this net phase angle change over a predetermined number of range increments to compute average clutter velocity with respect to the radar system location.

A bona fide signal in the moving clutter may then be recognized on the basis of its exceeding the average clutter velocity. A quantized output is effected by means of a logic arrangement which detects the condition of signal presence in one or two adjacent ones of the range increments provided these increments are preceded and followed by a predetermined relatively small number of range increments exhibiting no signal above the said average clutter velocity.

11 Claims, 2 Drawing Figures

ADAPTIVE CLUTTER VELOCITY CANCELLATION SYSTEM FOR PULSED DIGITAL MTI SYSTEM

CROSS REFERENCES TO RELATED APPLICATIONS

This application is a continuation-in-part of U.S. patent application Ser. No. 125,257 filed Mar. 17, 1971 now abandoned. That parent application bears the same title and common inventorship as the present application.

BACKGROUND OF THE INVENTION

1. Field of the Invention

This invention relates to radar systems, and more particularly, to moving target indicator systems of the digital Doppler type. More particularly, the present invention relates to a system which adjusts or adapts itself to a maximum cancellation of "moving clutter".

2. Description of The Prior Art

Moving target indicator radars, per se, have long been known. The general subject of MTI and pulse-Doppler radar (the latter being a category into which the present invention may be said to generically reside) is presented in Chapter 4 of the textbook "Introduction to Radar Systems" (1962) by Merrill I. Skolnik (a McGraw Hill book). Another book by the same author and publisher, entitled "Radar Handbook" (1970), also discusses the subject in its Chapter 19. Also, a discussion in Chapter 35 of the latter identified reference under the title Digital Signal Processing is germane in that the present invention is, broadly speaking, a type of digitally processed Doppler radar system.

Yet another reference of background interest in the present connection, is U.S. Pat. No. 3,441,930, entitled "Doppler Radars". That reference describes the subject of digital encoding of amplitudes of signal within discrete range increments. The said range increments represent intervals of duration on the order of the system transmitted pulse, and hence, a relatively large number of these occur successively during each pulse repetition period of the radar system.

Digital processing of signals in a Doppler radar affords certain well known advantages. Among these is inherent adaptability to staggered or other types of variable PRF systems. Ordinarily, analog delay devices used in signal comparison in MTI systems are not adapted to variable PRF systems without great complexity and unusually stringent stability requirements. Moreover, in recent times, the refinement of digital components and the subminiaturization of such devices as memories, shift registers, counters and other multichannel or multi-digit subsystems is making digital instrumentation of radar systems particularly attractive and increasingly economical.

A modern moving target indicator radar system must not only be adapted to variable PRF operation (for elimination of blind speeds and for other reasons) but must also account for such extrinsic factors as motion of the platform upon which the radar system operates. coordinate.

One of the particular problems of the prior art concerns identifications of bona fide targets in the presence of such moving clutter as chaff, hydrometeroic phenomena, and terrain features exhibiting apparent motion because of the actual motion of the radar platform in the range corrdinate. Radar system instrumentations have heretofore employed selective Doppler band-pass control and other such means, but have not addressed themselves to the more sophisticated aspects of design for operation in these situations.

The manner in which the present invention solves problems of the prior art and uniquely advances the art of instrumenting modern pulsed digital Doppler MTI systems will be more fully understood as this description proceeds.

SUMMARY OF THE INVENTION

In accordance with the foregoing discussion of the prior art and its limitations and disadvantages, it may be said to have been the general object of the present invention to provide an adaptive pulse Doppler MTI radar system which is capable of discriminating between bona fide moving targets and "moving clutter".

Ordinarily, a bona fide moving target is relatively small in size and does not reflect in depth as does a mountain or hydrometeoric phenomena (such as rain, hail and snow storm systems). Apparent motion of mountains or other fixed terrain features due to motion of the radar platform itself (as for airborne or ship borne radars) constitutes a clutter motion factor which affects all target ranges although not uniformly for all angles of scan. Such clutter as chaff and weather however, are localized phenomena and not correctable by methods which are based on pre-programming of effects known and predeterminable, such as radar platform motion. The present invention reduces or eliminates the effect of either type of basic moving clutter problem (predeterminable and not predeterminable), or any combination of them.

In the present invention, the velocity content of the MTI coherent phase detector output is recognized and all moving target signals remaining (after the usual digital subtraction of digitized video between adjacent pulse repetion periods) are subjected to a velocity averaging process over a predetermined range band. Bona fide moving targets are removed from the average computation process, although this is a refinement not absolutely necessary to the process because of the relatively small impact of bona fide moving targets on the average.

It will be realized that average clutter velocity is, in moving clutter situations, usually low compared to the velocity of even a slow-moving bona fide target. Accordingly, a digital threshold circuit is employed to recognize and tentatively identify as bona fide targets, those signals in any of the video encoded in each range increment of the train of digitized video which exceed the threshold (average) velocity.

A logic circuit performs the final recognition of bona fide moving targets by recognizing above-threshold digital video in one or two adjacent range increments preceded and succeeded by one or two increments not containing above-threshold signal level.

The manner in which the instrumentation of the system is accomplished will be understood from the more detailed description hereinafter.

DESCRIPTION OF THE PREFERRED EMBODIMENT

Figure 1:
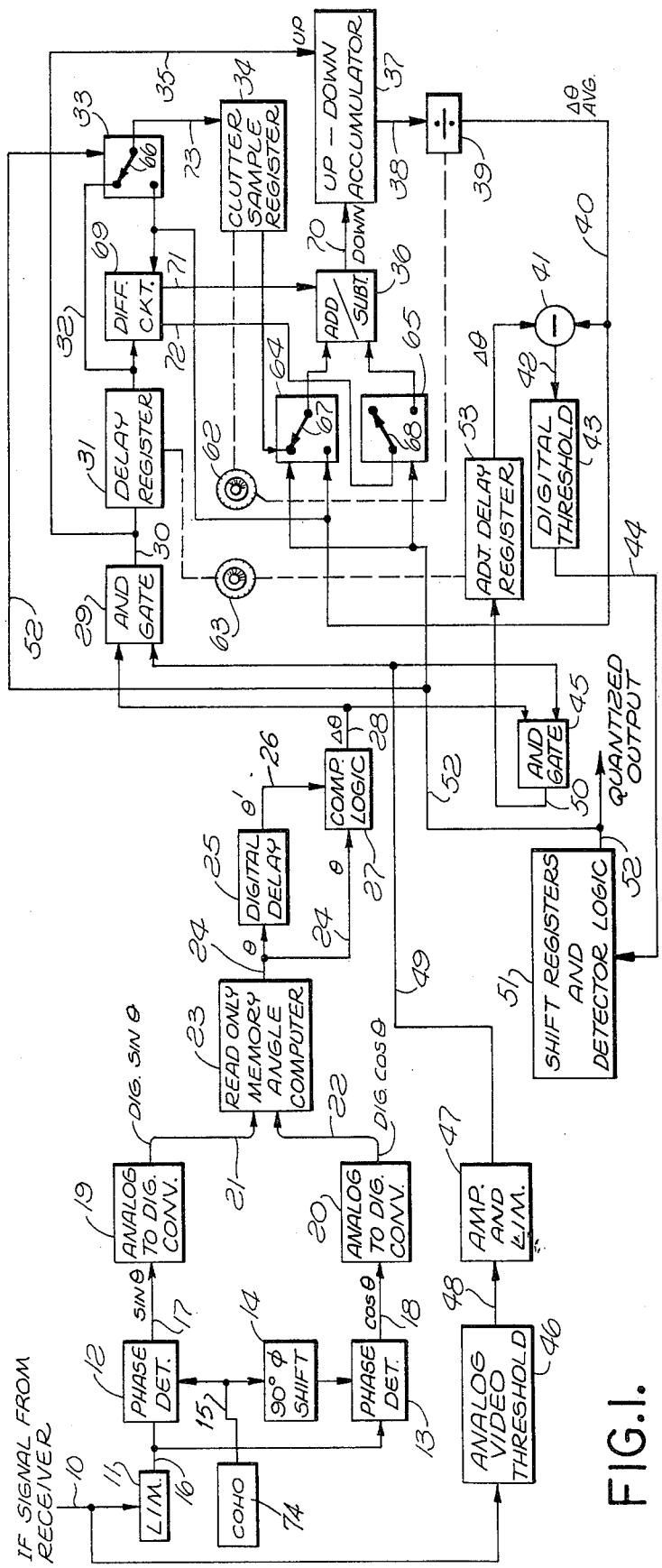
FIG. 1 is an overall functional and structural schematic block diagram of a system in accordance with the present invention.

Referring now to FIG. 1, an overall block diagram of a typical circuit arrangement in accordance with the present invention, is shown.

Beginning at the signal input 10, the first few components will be recognized as common and well known in Digital Doppler MTI radar. It will be understood that the IF signals at 10 have been received and down converted using the conventional prior art stable local oscillator (STALO) so that the Doppler components are recognizable as such, without false indications introduced by circuit instabilities. A limiter 11 operates to remove amplitude instability or variations to remove those factors as a source of false indications.

The output 16, of the limiter 11, is supplied to two phase detectors 12 and 13. These are the usual coherent detection phase detector circuits operating against a coho signal at 15, generated by coho 74. The said coho (coherent oscillator) serves to "remember" the phase of transmitted energy, so that the phase detector outputs are composed of invariant video corresponding to fixed targets and intermixed bi-polar video modulated by Doppler frequency components corresponding to moving targets. In the present invention, two phase detectors, typically 12 and 13 of FIG. 1, are employed to obtain sine and cosine outputs 17 and 18, respectively. The fixed phase shifter 14 provides a 90° phase shift of the coho signal, so that the phase detector 13 operates against an orthogonal coho signal, and therefore provides a cosine output, whereas the output of phase detector 12 may be regarded as the sine output. The angle $\theta$ in that context is the phase angle at IF frequency between coho oscillations and received energy on an instantaneous basis. It will be realized that, in a fundamental sense, the cosine $\theta$ signal is only necessary to resolve the ambiguities inherent in a sine function over the continuous multiple $2\pi$ Radians of possible signal phase shift due to Doppler effect.

The analog-to-digital converters 19 and 20 serve to convert instantaneous amplitude of signal into a corresponding discrete digital word on a range incremental basis. This particular step is inherent in all digital Doppler radar systems and is variously described in the literature including U.S. Pat. No. 3,441,930. For simplicity, the actual timing (clock) circuits for the digital instrumentation of the present invention are omitted. It is well understood, however, that such timing functions are necessary for the digital instrumentation. Their nature is such a well known part of the digital logical design arts that they are commonly omitted from structural and functional block diagrams of digital devices.

Actually the digital encoding of the sine $\theta$ and cosine $\theta$ phase detector outputs at 17 and 18, respectively, is necessarily accomplished in real time. Accordingly, a relatively high bit rate is required. If the range increments within the successive pulse repetition periods are of 1 $\mu$ sec. duration (for example), the word rate for digital encoding would be 1 MHz. Depending upon the type of digital word formation, the required bit rate could be substantially higher. As is normal in digital Doppler MTI systems, the pulse repetition frequency would be a synchronous submultiple of the bit or clock rate aforementioned. Encoding of amplitudes in range increments into ten bit words in parallel is a representative approach to that instrumentation. Typically, a 10 bit word descriptive of instantaneous amplitude of signal within a range increment in a given pulse repetition period is accomplished in 200 nanoseconds or less at the present state of this art.

From the foregoing, it will be realized that the digitized sine $\theta$ and digitized cosine $\theta$ on leads 21 and 22, respectively, contain a sequence of digital words. The sine and cosine words are two parallel contemporaneous descriptions of signal amplitude within each range increment. The read-only angle computer 23 is essentially a fixed digital memory subsytem into which has been installed the arcsines and arccosines of the range of phase angles. This computer essentially "looks up" the angle corresponding to the digital sine term and cosine term. The output, in digital form also, is applied to a small logical comparison circuit within the computer 23 to eliminate the ambiguous angle read-out which would result from the use of either sine or cosine term of itself. Accordingly then, at the output 24, a non-ambiguous digital phase angle signal is produced. This subsystem of the overall combination is instrumentable from prior art knowledge and skill in this art.

Fundamentally, any digital Doppler MTI system involves some sort of comparison between the encoded phase detector outputs from a given pulse repetition period to the next and so on seriatim. The comparison logic circuit 27 simply subtracts the $\theta$ from the $\theta'$ signal or vice-versa, these being supplied on along the leads 24 and 26, respectively, to the circuit 27. The digital delay 25 is one repetition period long in effect, if not structurally. Actually, it is most conveniently operated to begin a read-out of stored signals in digital form at the occurrence of each successive transmitted pulse. In that way the system can accommodate variable PRF operation. Frequently, the instrumentation of the block 25 in digital Doppler systems may involve two memory stacks (the term "stack" being commonly used in connection with core-type memories), one of these receiving current information in a given pulse repetition period while the other reads-out the same information synchronously from the last pulse repetition period on lead 26. The result of the combination of circuits 25 and 27 is the production of a $\Delta\theta$ signal 28 which is the difference signal and therefore, does not contain digital words corresponding to fixed targets in any range increment, since these have essentially the same encoded amplitude on leads 21 and 22 and therefore cancel in 27.

It is important to realize that $\Delta\theta$ is effectively a velocity term, that is, its digital magnitude is a measure of velocity.

The present invention is primarily concerned with the inconstant cancellation problem caused by apparent clutter velocity situations, as hereinbefore described. Thus, the signal $\Delta\theta$ at 28 will contain many encoded signals for range increments in which there is no real moving target, but only the appearance of target motion of the types hereinbefore mentioned.

In order to improve the general signal-to-noise ratio and to avoid the adaptation of the system to noise, the analog video signal from 10 is passed through a video threshold circuit 46 which also includes a straightforward envelope detector to reduce the IF signal 10 to the video domain. In 46, a determination is thereby made that a signal, whether clutter or moving target, is sufficiently great in amplitude over successive repetition periods to be considered for processing. Thus, when a signal exceeds a predetermined threshold in 46, it is supplied on lead 48 to an amplifier and limiter 47 which produces a standardized amplitude pulse on lead 49. This pulse is approximately one range increment in time duration (i.e., comparable to one transmitted pulse duration), and is supplied as a gate energizing signal to AND gates 29 and 45. It will be seen as this description proceeds, that the use of this type of gating reduces the effect of noise and spurious signal inclusion in the average clutter velocity computation to be thereinafter made.

The AND gate 29 is to be understood to be a multichannel circuit, one channel for each bit or digit of the $\Delta \theta$ words applied thereto, and similarly, leads carrying digital words are multi-conductor connections.

The difference signal $\Delta \theta$, as enabled by signal on 49, passes through the AND circuit 29 and, via output 30, into a delay register 31 having a delay of 3 range increments (or half of the digits of the output shift register stages 54, 55, 56, 57, 58 and 59) plus a variable delay factor selected by control 63. Accordingly, signals at 32 are delayed by a number of range increments as compared to those at 30. The purpose of this delay will be evident when the circuit 51 is explained. The reason for the selection of a particular delay value in 31 will be apparent as this description proceeds.

The circuitry following the output of delay register 31, for processing the signal on lead 32, approximately up to the subtraction circuit 41, deals with the generation of the $\Delta \theta$ avg. signal, including logic circuitry for the elimination of velocity terms in any range increment containing a bona fide moving target from the averaging process.

Looking ahead to the final quantized output on lead 52, it will be noted that only signals corresponding to bona fide moving targets will be present at that point. Accordingly, this signal on lead 52 can be used as a basis of a switching operation involving electronic switches 33, 64 and 65. It may be said that the output quantized signal 52 is itself used as a switching pulse, so that during any range increment corresponding thereto, action may to taken to correct the averaging process. In the instrumentation of FIG. 1, the calculated average is substituted for the bona fide target signal velocity value within those range increments (range bins), as will be fully understood from the description following.

The electronic switches 33, 64 and 65, are understood to be fast acting devices responding to the signal on 52 and remaining switched (in synchronism) to their alternate positions only so long as the signal for any given range increment on lead 52 is extant, The said switches 33, 64 and 65 are illustrated in their positions corresponding to the absence of a bona fide signal on lead 52, and accordingly, the said alternate positions correspond to movement of the switch arms 66, 67 and 68, respectively, to the alternate positions. It will be realized of course, that showing these electronic switches as single-pole, double-throw switches is symbolic only, it being understood that they would be electronic devices, preferably of the solid-state type.

With the aforementioned electronic switches in the illustrated positions, the digital signals on lead 32 pass through switch 33 to the clutter sample register 34, and in parallel signal 32 goes to the differencing circuit 69. The symbolic control knob 62 provides a ganged adjustment of the clutter sample register 34 and the divider 39, the latter to be described later in this description. Thus, the number of range increments registered in 34, in digital form of course, may be adjusted, and at the same time, the division ratio of 39 is correspondingly adjusted. If, for example, the clutter sample register 34 was adjusted to sample a block of 32 successive range increments on the lead 73, the divider 39 would be comtemporaneously adjusted to divide by a number comprising the delay of 31, in bits, plus 32 (the length, in bits, of the sample in 34). Such an arrangement will be recognized as basic to an averaging process.

For convenience and instrumentation simplicity, it is desirable that the selection of the range increment capacity of the register 34 be made in digital progression. That is to day, the register 34 should have a capacity of 2, 4, 8, 16, 32...etc. range increments.

Because of the delay introduced in 31, the operation of the clutter sample process in 34 is somewhat delayed, vis-a-vis, the signal on 35 applied to the up terminal of the up-down accumulator 37. This accumulator 37 has the effect of accumulating the digital words corresponding to all the signals on lead 35, i.e., all the $\Delta \theta$ values in range increments within each pulse repetition period for which there is a corresponding bona fide or moving clutter signal extant on lead 49.

If no bona fide moving targets are present at lead 52, the three electronic switches remain in the positions illustrated, and the output of the register 34 passes through electronic switch 64 via the arm 67 into an add-subtract circuit 36 and directly through to the down-accumulating input of 37. The output of the divider 39 is then equal to the uniform average, the same value in each range increment within 34, of the moving clutter. This is a situation which might occur if the device of FIG. 1 were mounted on a moving platform, such as on a ship or in an aircraft.

In accordance with the foregoing it will be seen that the adjustment of register 34 constitutes selection of that portion of a pulse repetition period during which the clutter velocity averaging, of which the circuit is capable, will be effective. Thus, for example, if 32 range increments are selected for the clutter sample, the divider 39 will be contemporaneously set to divide by the bit setting of 31, + 32 bits. Although not shown, it will be realized that the operation of the clutter sample delay register 34 could be similarly angle gated, if the present invention were to be used in connection with an angular scanning radar system, and if it were desired to confine the operation of the device to a predetermined angular sector. In that instance the clutter averaging operation would be confined to a predetermined angle and a predetermined range belt corresponding to the selected range increments (for example).

It will be noted that ganging of delay registers 31 and 53 insures that the bona fide target at lead 32 is coincident with the same bona fide target occurring on 52.

The signal on lead 70, the down accumulating input of 37, operates to leave a total value in 37 which, divided by the setting of 39, produces a $\Delta \theta$ average (lead 40) which is representative only of the moving clutter area concerned at the time. The said variable delay in 31 is responsive to symbolic control knobs 63 and is ganged to the adjustable delay register 53, which introduces a delay equal to a fraction (such as one half) of the delay setting of 31, plus that of 34. The differencing circuit 69 has no function with the electronic switches in the positions shown, its signal output lead 72 ending within electronic switch 65, as shown, however. Circuit 69 continuously takes the difference of the $\Delta \theta$ average signal from lead 40 as compared to signals on lead 32 whether used or not. The output 72 (of 69) represents the magnitude of this difference on a continuous basis, and will be substantially zero so long as no bona fide moving targets are encountered. Circuit 69 has, in addition, a polarity control output 71 which "tells" the add/subtract circuit 36 whether to add or subtract in order to effect removal of a non-standard (non-average) down accumulation signal at 70.

For the sake of further description, let it now be assumed that a bona fide target is identified and comes through on lead 52 in a particular range increment within the clutter samples stored in 37. Switch arm 66, 67 and 68 now are caused to change positions for the duration of that particular range increment. Accordingly, the add/subtract circuit 36 receives the $\Delta \theta$ Avg. signal from lead 40 through electronic switch 64 and the output of the differencing circuit 69 through electronic switch 65. The signal on lead 72 represents the amount by which the signal in this range increment of interest is more or less than $\Delta \theta$ Avg. Accordingly, circuit 36 is controlled in accordance with the polarity control signal on 71 to either add or subtract to produce a signal equal to the average during that range increment. Thus, in effect a signal of the average velocity value is substituted, the delays 31 and 53 providing time for the recognition of this situation and the development of the signal on lead 70 at the down input of the accumulator 37. It should be emphasized that this signal on lead 70 exceeds average, or is less than average, as appropriate to compensate for the automatic inclusion of the non-average range increment at the up-terminal of 37.

It will not be realized that the output of the divider 39 is an average compensated for bona fide moving targets within the clutter sample, and, when added to the instantaneous $\Delta \theta$ signal 28, as received through AND gate 45, via lead 50 and the compensating delay register 53, provides that the output lead 42 of subtraction circuit 41 contains only instantaneous velocity values in range increments which are above or below the average velocity. The AND gate 45 will be realized to produce an output on lead 50 only when the analog signal line 49 confirms the presence of a bona fide or moving clutter signal.

The digital threshold circuit 43 is in the nature of a decision circuit and at this point the basic character of the signal changes. Whereas, up to the circuit 43, the signals have been in fully encoded word form, the signals at 44 amount to simply "yes-no" decisions (presence or absence of signal) for each range increment. Accordingly, the AND gate 45 is a simple single channel coincidence device, providing an output for every signal within the corresponding range increment, on the lead 50.

Figure 2:
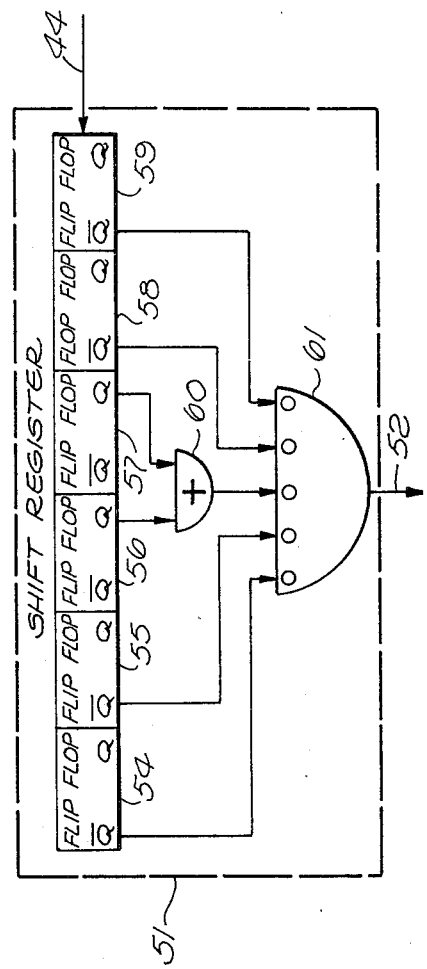
FIG. 2 is a more detailed diagram of a portion of the system (comprising a shift register and detector logic) of FIG. 1.

The manner in which the quantized output at 52 is produced from the signals on lead 50 in the shift register and detector logic 51 will be best understood from FIG. 2.

In FIG. 2 the succession of "YES" and "NO" signal identities on lead 44 is supplied to a shift register comprising the bistable of flip-flop circuits 54, 55, 56, 57, 58 and 59. The shift register comprised of these elements operates continuously throughout each pulse repetition period shifting forward in time or "RIGHT TO LEFT" one stage during each range increment, whether or not signal is present. Timing (clock) circuits not shown, but well understood in this art, provide this shift. Allowing for a nominal range separation between adjacent bona fide targets, it will be seen that the six bi-stable circuits of this shift register are capable of identifying a bona fide target based on its presence within one or two adjacent range increments and its absence within two range increments on either side, timewise. Since a signal may straddle between adjacent range increments, it may be counted as present in two adjacent increments by the encoders 19 and 20, even though said signal is no greater in duration than any one range increment. It will be observed that six adjacent range increments, beginning with two having no signal corresponding to $\overline{Q}$, will advance their way through the shift register to the flip-flops 54 and 55. If these are followed, for example, by one or two range increments containing bona fide signal, at least one of the flip-flops 56 and 57 have Q outputs. Similarly, the two trailing flip-flops 58 and 59 exhibit a $\overline{Q}$ output based on the aforementioned logical assumption. Whenever, and each time, this condition is extant, the Q signals from 56 and 57 or either of them passes through the "ADDER" (OR circuit) 60 into the quintuple "AND" circuit 61. The said circuit 61 is constructed so that these five contemporaneous inputs in the logical order described, produce an output affirmation at 52, during each range increment in which the actual signal presence applies, according to the criterion aforementioned.

It will now be realized that the three bit "centering" delay introduced at circuit 31 is necessary in order to allow a bona fide signal to "shift its way" through the shift register in 51 into the center bistable positions (at least to the center bistable position 57) in that amount of time delay.

It may be said that the circuit hereinbefore described, adapts itself or "learns" over the short term and appropriately rejects moving clutter, in the range band corresponding to the clutter sample, as described.

Those skilled in this art will recognize at least one, and usually more than one, appropriate digital instrumentation for each of the structural blocks illustrated. Of course, the entire instrumentation is consistent with current solid state techniques, including integrated circuits.

All of the individual digital components are known logical components and subsystems of the described embodiment. Their detailed instrumentation is readily provided by those skilled in digital computing devices.

Certain variations and modifications will suggest themselves to those skilled in this art and accordingly, it is not intended that the drawings in this description should be regarded as comprising a limitation on the scope of the invention, the latter being illustrative and typical only.

What is claimed is:

1. A digital pulse Doppler radar system comprising:
   means for digitally encoding received echo signals discretely within each of a succession of relatively short duration range increments each of fixed range position within successive repetition periods of said radar system, said means encoding said signals to have digital magnitudes which are a function of the instantaneous Doppler phase angle of received signals in each of said range increments;
   means for differencing said digitally encoded signals between adjacent pulse repetition periods to cancel signals exhibiting substantially no echo signal phase change;

means for sampling a predetermined band of said range increments during successive pulse repetition periods to determine an average velocity factor as a function of the average moving signal velocity over said band;

and means responsive to said average factor and to the individual signal velocities for producing a quantized output during each range increment in which a signal velocity varies from said average moving target velocity within said band.

2. Apparatus according to claim 1 in which digital logic means are included responsive to said quantized output to correct for the inclusion of corresponding bona fide signal encoded values in said average factor.

3. Apparatus according to claim 2 in which additional means responsive to signal within individual range increments and to said quantized output are included, said additional means being operative to compute the difference between the average velocity within said predetermined band and the velocity of any bona fide signal within said band and to apply said difference to said means determining said average velocity factor to correct for inclusion of signals differing in velocity from said average in the averaging process.

4. In a digital pulse Doppler radar system which transmits and receives microwave pulses and includes a mixer and coherent oscillator, the combination comprising:

first phase detector means responsive to said mixer and coherent oscillator for producing a first signal train including fixed target echoes and echo signals modulated by a Doppler frequency as a function of a corresponding moving target;

means connected to said coherent oscillator for providing a phase shifted coherent oscillator signal;

second phase detector means responsive to said mixer and said phase shifted coherent oscillator signal for producing a second signal train including fixed target echoes and echo signals modulated by a Doppler frequency as a function of a corresponding moving target;

first and second digital encoding means for encoding the instantaneous signal amplitude in each successive range increment of a predetermined number of relatively short adjacent time increments within each of the repetition periods of said radar system, to produce first and second corresponding encoded video signal trains;

means responsive to said first and second signal trains for producing a third digital signal train representative of the echo phase angle corresponding to said first and second video signal trains as representative of the sine and cosine of said echo signal phase angle;

digital comparison means responsive to said third digital signal train for producing a fourth signal train containing substantially only the digital difference between said third signal train in a given repetition period and in the last previous repetition period;

a digital accumulator responsive to said fourth signal whereby said fourth signal train is digitally accumulated;

means for applying said fourth signal train and a correction to said accumulator to reduce the digital accumulation therein over a predetermined sample band of said range increments;

a divider responsive to and for dividing the digital number in said accumulator by the number of said range increments in said sample band, thereby to obtain a digital average representative of average moving target velocity within said sample band;

subtraction means for subtracting the output of said divider from said fourth signal train;

a digital threshold circuit responsive to said subtraction means and being operative to exclude signal values within any of said range increments not exceedng a predetermined value;

and detection means responsive to the output of said threshold circuit for producing a quantized output for each range increment during which a signal is passed by said threshold circuit, provided said signal is preceded and followed by a predetermined number of range increments during which said threshold circuit output is zero.

5. Apparatus according to claim 4 in which said detection logic means includes a shift register having a predetermined plurality of bistable stages, an input stage which is responsive to the output of said digital threshold circuit, for shifting the condition of said input stage through said plurality of stages at the frequency rate of said range increments, and said detection means operate to detect the condition of signal in a central stage of said register preceded and followed by a predetermined number of said stages in a "no-signal" condition.

6. The invention set forth in claim 5 in which said shift register stages are six in number, said central stage is at least one of the third and fourth stages, and said stages in a "no-signal" condition are the first, second, fifth and sixth stages, said signal and "no-signal" conditions being further defined as Q and Q, respectively.

7. Apparatus according to claim 6 in which said detection means includes a six input terminal coincidence circuit, said terminals being connected discretely to the outputs of corresponding ones of said shift register stages.

8. Apparatus according to claim 7 including a delay circuit of at least two range increments, said delay circuit being connected to delay said fourth signal train from the output of said digital comparison means and to supply said delayed signal train to said accumulator.

9. The invention set forth in claim 8, in which said first and second digital encoding means are further defined as providing said range increments approximately equal in duration to the transmitted pulse duration of said radar systems.

10. Apparatus according to claim 4 including a delay circuit between said digital comparison means and said digital accumulator for delaying said fourth signal train by a time at least equal to the duration of said predetermined number of range increments during which said threshold circuit output is zero preceding a signal at the output of said threshold circuit.

11. Apparatus according to claim 5 in which means are included for generating and applying said correction signal and said quantized output to block the inclusion of signal in any of said range increments in which said quantized output is extant in the signals applied to said accumulator and sampling means.

* * * * *